C. C. BRADFIELD.
METER SUPPORT.
APPLICATION FILED JULY 1, 1919.
1,346,440.
Patented July 13, 1920.
2 SHEETS—SHEET 2.
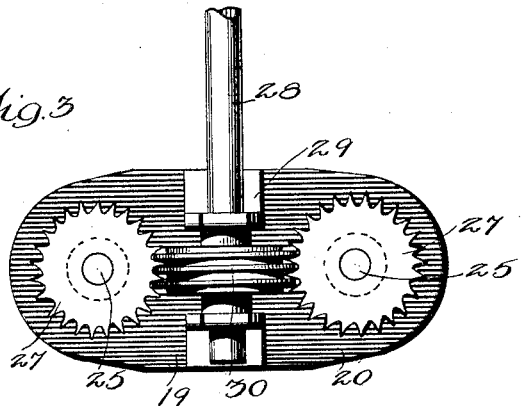
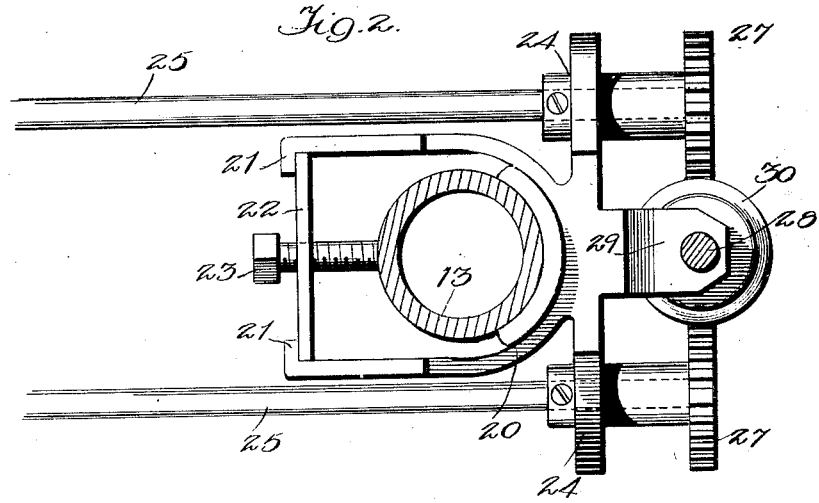
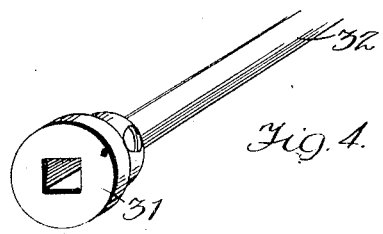
C. C. Bradfield, Inventor;
Witnesses
George C. Myers
By Munn & Co
Attorney

UNITED STATES PATENT OFFICE.

CLYDE CLINTON BRADFIELD, OF HARBOR SPRINGS, MICHIGAN.

METER-SUPPORT.

1,346,440.   Specification of Letters Patent.   Patented July 13, 1920.

Application filed July 1, 1919. Serial No. 308,001.

*To all whom it may concern:*

Be it known that I, CLYDE CLINTON BRADFIELD, a citizen of the United States, and a resident of Harbor Springs, in the county of Emmet and State of Michigan, have made certain new and useful Improvements in Meter-Supports, of which the following is a specification.

My present invention relates generally to meter supports, and more particularly to meter supporting connections within meter boxes, my object being the provision of mechanism by which a meter may be readily and quickly removed and replaced from the cover of the box in such a way as to insure rigid support of the meter in its operative position. With this general statement in mind my invention will be better understood from the following description, wherein reference is made to the accompanying drawing forming a part of this specification, and including several figures, of which:—

Fig. 2 is an enlarged horizontal section taken on line 2—2 of Fig. 1;

Fig. 3 is an end view looking at one end of the support, and,

Fig. 4 is a detailed perspective view of one end of the wrench removed.

Figure 1:
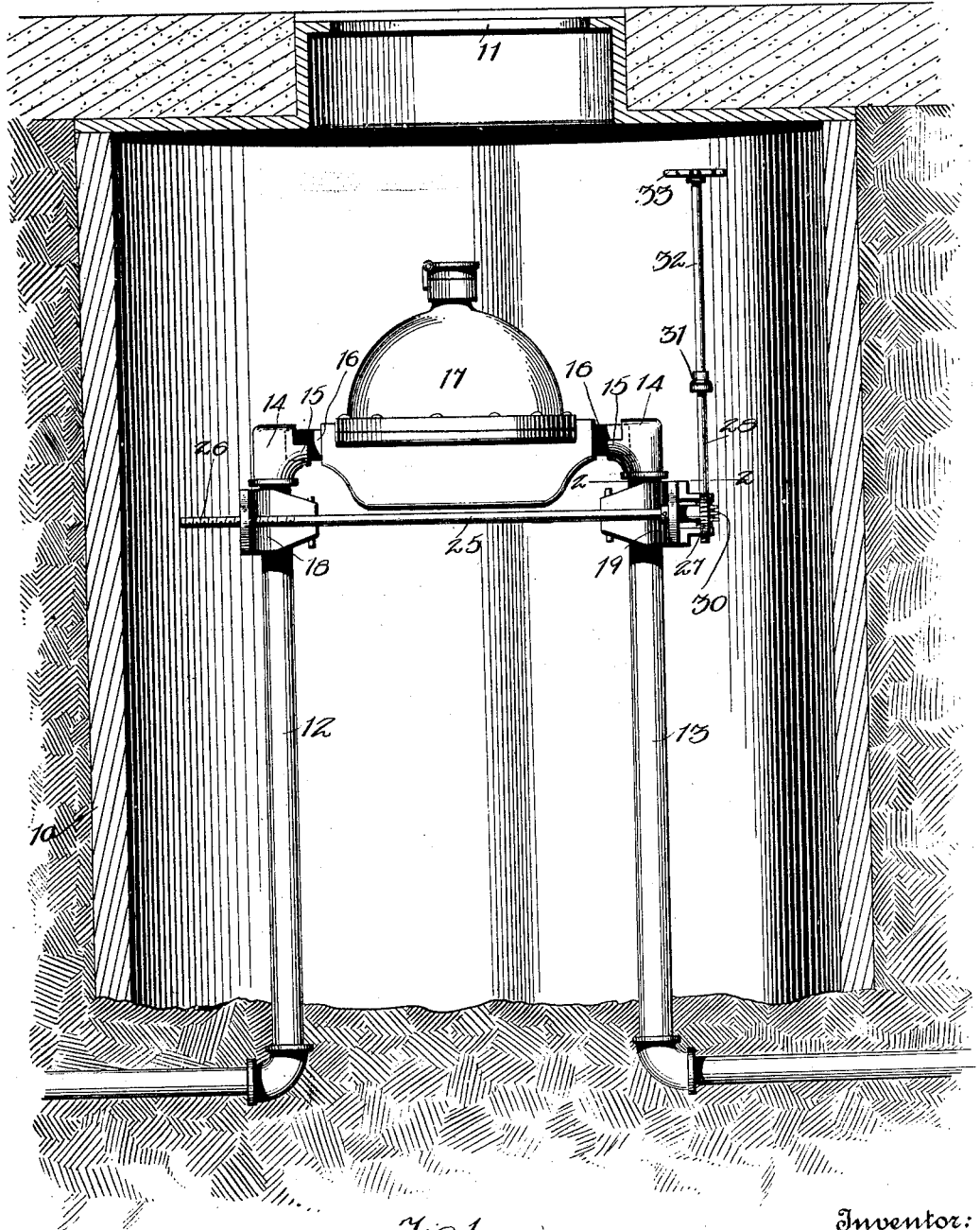
Figure 1 is a vertical transverse section through a meter box within which my improvements are shown.

Referring now to these figures, and particularly to Fig. 1, I have shown at 10 a meter box, at the upper end of which is a reduced opening 11 normally closed by a cover, not shown, and within which box upstands a pair of vertical parallel pipes 12 and 13 spaced apart, as shown, and at the upper ends of which my invention proposes the mounting of elbows 14, whose horizontal portions have lower semi-cylindrical extensions 15 on to which the diametrically projecting nipples 16 of a meter 17 may be initially placed.

My invention proposes an engaging clamp for coöperation with the pipes 12 and 13, so as to adjust their upper ends toward one another, and thus force the extremities of the meter nipples 16 snugly within the horizontal portions of the nipples 14, and into non-leaking connection with the upper ends of the pipes 12 and 13 in this way.

My invention further proposes clamping means of such a nature that the parts may be readily released so that the meter may be removed when desired for purposes of repair and substitution, from the upper opening or man-hole 11 of the meter box, from which the clamping and releasing of the pipe engaging members provided by my invention may be readily controlled.

To this end I provide a pair of oppositely facing pipe engaging saddles or clamps 18 and 19, each of which has a U-shaped pipe engaging portion 20, the extremities of which are angularly flanged at 21 to provide abutments for a threaded bearing plate 22. Through this bearing plate a clamping screw 23 is threaded, whose inner end is shiftable against the pipes 12 and 13 so as to force the same tightly against the body of the clamp 20, as seen particularly in Fig. 2. Each of the clamps 20 has outstanding arms 24 provided with bearings for shafts 25, the bearings of the clamp 18 being internally threaded to coöperate with the threaded ends 26 of said shafts 25, the latter of which are rotatable through the bearings of the clamp 19. In this way rotation of the shaft, in view of the non-rotatable support of the clamps in connection with the pipes 12 and 13, will bring about shifting movement of these clamps toward and away from each other, according to the direction of such rotation. For the purpose of rotation, the ends of the shafts 25 opposite their threaded portions 26, which project through the bearings of the clamp 19, are provided beyond said clamp 19, with gears 27 between which a vertically disposed shaft 28 is journaled through brackets 29 projecting from the clamp 19. Shaft 28 has adjacent to its lower end, a spiral gear 30 disposed between and in engagement with the spur gears 27, and is provided with a squared upper end to enter the squared socket 31 of the lower end of wrench 32, at the upper end of which is a handle 33. The wrench 32 thus permits authorized persons with a wrench to pass the socket 31 thereof over the squared upper end of the shaft 28, and by manipulation of the wrench from the exterior of the meter box 10, either tighten or loosen the clamps 18 and 19 as desired. It should be observed, however, that for this purpose the threads of one of the shafts 25 are inclined in an opposite direction with respect to the threads of the other shaft.

Thus, after the clamping members have been once inserted in connection with the upper ends of the pipes 12 and 13, it is very obvious the meter 17 may be connected or disconnected as desired, by simply applying the wrench 32 through the man-hole 11, or upper opening of the meter box 10 affording considerable convenience in connection with the repair and substitution of meters, as well as one which when the parts are clamped, will bring about effective non-leaking connection between the meter nipples and the elbows 14 of the pipes 12 and 13.

I claim:—

1. The combination of a pair of upright yieldingly supported pipes having elbows at their upper ends, a meter disposed between the pipes and having nipples extending into the horizontal portions of said elbows, clamping members engaged with the said pipes adjacent to the elbows for shifting the same toward and away from one another, adjusting connections between the said clamping members and manually controlled means for actuating said connections including a controlling shaft, and a wrench having means to detachably engage the said controlling shaft.

2. The combination of upright pipes yieldable toward and away from one another, a meter having oppositely projecting nipples engaged with the upper ends of said pipes, a pair of clamping members engaged with the pipes in opposition to one another adjacent to the upper ends of the pipes, shafts extending between said clamping members and rotatable through portions of one of the clamps, said shafts having threaded connection with the other of the clamps, and means adjacent the first mentioned clamp for rotating the shafts including an upright shaft geared to the connecting shafts, as and for the purpose set forth.

3. The combination of a pair of upright pipes yieldable with respect to one another, and provided with meter engaging means at their upper ends, of a clamping device including a clamping member in engagement with each of the pipes, a pair of shafts rotatably engaged at one end with one of the clamps and having threaded connection at their opposite ends with the other clamp, gears secured on the first mentioned ends of the said shafts, and a controlling shaft mounted in connection with one of the said clamps and having a gear in engagement with the gears of the clamp connecting shafts, as described.

4. The combination of a pair of upright pipes yieldable with respect to one another, and provided with meter engaging means at their upper ends, of a clamping device including a clamping member in engagement with each of the pipes, a pair of shafts rotatably engaged at one end with one of the clamps and having threaded connection at their opposite ends with the other clamp, gears secured on the first mentioned ends of the said shafts, a controlling shaft mounted in connection with one of the said clamps and having a gear in engagement with the gears of the clamp connecting shafts, said controlling shaft having a squared opposite end, and a wrench having a squared socket for engagement with the squared end of said shaft, as described.

5. The combination of a pair of upright pipes yieldable with respect to one another, and provided with meter engaging means at their upper ends, of a clamping device including a clamping member in engagement with each of the pipes, a pair of shafts rotatably engaged at one end with one of the clamps and having threaded connection at their opposite ends with the other clamp, gears secured on the first mentioned ends of the said shafts, a controlling shaft mounted in connection with one of the said clamps and having a gear in engagement with the gears of the clamp connecting shafts, said controlling shaft extending approximately at right angles to the connecting shafts, and a wrench having means to detachably engage and actuate the controlling shaft.

CLYDE CLINTON BRADFIELD.